United States Patent Office 3,495,321
Patented Feb. 17, 1970

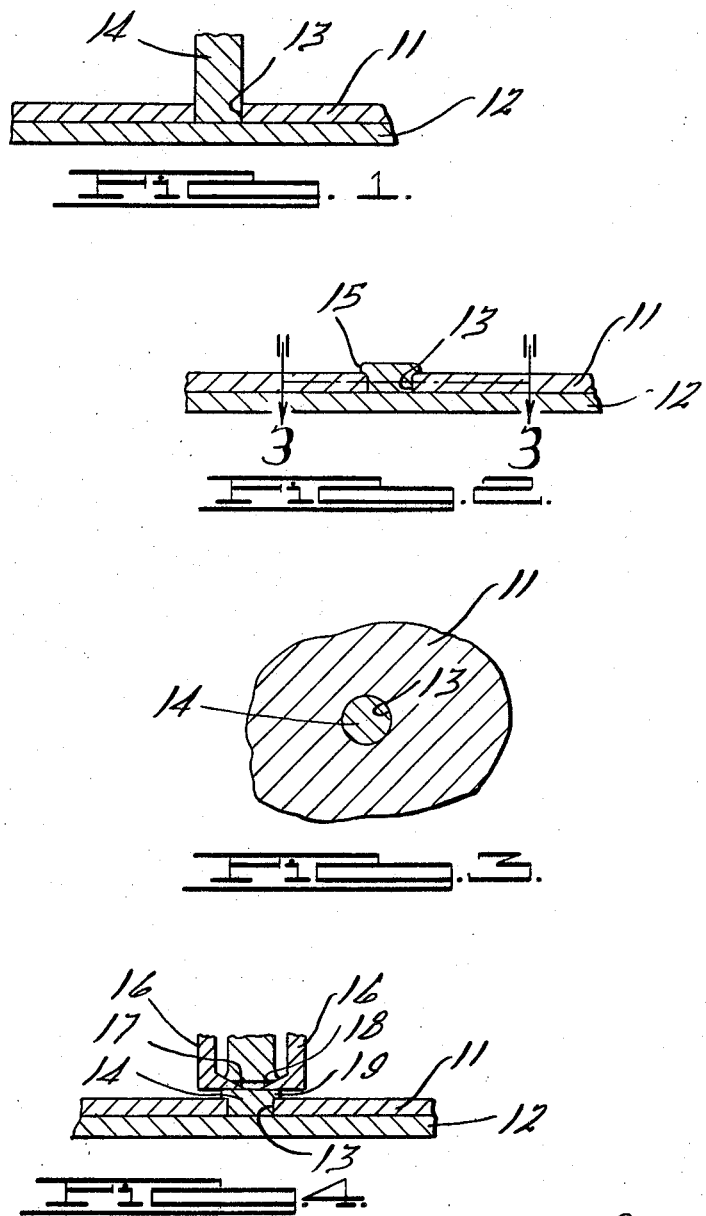

3,495,321
METHOD OF MAKING A CONNECTION
Gerald H. Shaff, William C. Blask, and Ralph J. Haren, Racine, Wis., assignors to Walker Manufacturing Company, a corporation of Delaware
Filed July 7, 1965, Ser. No. 470,063
Int. Cl. B23k *31/02*
U.S. Cl. 29—470.3                                    2 Claims

ABSTRACT OF THE DISCLOSURE

Several methods for frictionally welding two pieces together to form a rivet-like connection.

---

This invention relates to a connection between at least two metallic members and more particularly to an improved method for joining the members by means of frictional welding.

It is an object of this invention to provide an improved method for fixing two metallic members with respect to each other.

It is a further object of the invention to provide an improved method for frictionally welding two metallic members together.

It is a still further object of this invention to provide an improved method for frictionally welding two metallic plates with respect to each other.

The method for frictionally welding two pieces together embodying this invention comprises the steps of forming a circular aperture in one of the pieces and placing the pieces in juxtaposition with the aperture in alignment with a surface of the other piece. A metallic rod is inserted through the aperture into engagement with the aligned surface of the other piece and the rod is rapidly rotated with respect to the other piece. The heat generated by the rapid relative rotation raises the temperatures of the pieces sufficientlyy to cause them to be frictionally welded together.

Other objects and advantages of this invention will become more apparent as this description proceeds, particularly when considered in conjunction with the accompanying drawings, wherein:

FIGURE 1 is a cross-sectional view showing a first embodiment of a method of joining metallic pieces together;

FIGURE 2 is a cross-sectional view, in part similar to FIGURE 1, showing the finished connection;

FIGURE 3 is a cross-sectional view taken along the section line 3—3 of FIGURE 2; and FIGURE 4 is a cross-sectional view, in part similar to FIGURES 1 and 2, showing another embodiment of the invention.

Referring now in detail to the drawings and in particular to the embodiments shown in FIGURES 1 through 3, first and second metallic plates that are to be joined together are identified generally by the reference numerals 11 and 12. The plates 11 and 12 may be formed from any metallic substance which lends itself conveniently to frictional welding. Alternatively, only the plate 12 need be formed from a material that lends itself to frictional welding. A circular aperture 13 (FIGURE 3) is formed in the plate 11. Prior to the frictional welding process, the plates 11 and 12 are positioned in juxtaposition with the aperture 13 in alignment with a surface of the plate 12.

A metallic rod 14, which may be formed from any metal that lends itself conveniently to frictional welding, is inserted through the aperture 13 into engagement with the surface of the plate 12 adjacent the aperture 13. Preferably, the diameter of the aperture 13 and the diameter of the rod 14 is such that there will be some frictional engagement between the plate 11 and the rod 14. The rod 14 is then rapidly rotated with respect to the plate 12 by means of any known type of frictional welding apparatus. Due to the difference in sizes, it is preferable to rotate the rod 14 while holding the plate 12 stationary. It is to be understood, however, that the procedure could be reversed or that both the rod 14 and plate 12 could be rotated in the same direction at different velocities or in opposite directions at either the same or different velocities.

Axial pressure is exerted upon the rod 14 during the rapid relative rotation or at the completion of it. The axial pressure and relative rotation causes a heating of the end of the rod 14 and the adjacent surface of the plate 12. As is well known in frictional welding, the heat eventually reaches a point wherein the adjacent portions of the metals will fuse together and at this point the rotation is ceased. If desired the axial pressure may also be increased concurrently with the stopping of the rotation.

In addition to heating the rod 14 at its point of engagement with the plate 12, the rod will be heated along its length. The frictional contact between the portion of the plate 11 defining the aperture 13 and the rod 14 will also elevate the temperature in this area. The elevated temperature adjacent the upper surface of the plate 11, is sufficient to cause the torsional strength of the rod 14 to decrease. When this occurs, the rod 14 will shear at a point slightly above the plate 13. The shearing may also be promoted by ceasing the rotation temporarily until the rod 14 is welded to the plate 12 and then resuming it at a slightly lower speed.

After the rod 14 is sheared, the axial pressure may be continued to cause an upset 15 (FIGURE 2) which will affix the plate 11 relative to the plate 12. In addition, if the diameters of the aperture 13 and rod 14 are properly selected, the rod will itself be welded to the plate 11. The axial pressure which causes the upset 15 may be exerted after the shear is made by further increasing the axial pressure at that time.

In certain instances it may be desirable to provide the cut in a more positive manner. The embodiment shown in FIGURE 4 provides a structure for positively cutting the rod 14. In FIGURE 4, the plates, aperture and rod have been identified by the same reference numerals as in FIGURES 1 to 3 since the method for welding the rod 14 to the plate 12 may be considered to be identical to that previously described. In addition, the rod 14 may be welded to the plate 11 if the diameters of the rod and aperture 13 are appropriately selected, as has been noted.

A collet having a pair of jaws 16 is supported above the plate 11. The jaws 16 have inwardly extending knife-edge portions 17 and 18. The jaws 16 are movable in a radial direction with respect to the rod 14 and are withdrawn from it during the frictional welding of the rod 14 to the plate 12.

After the rod 14 has been frictionally welded to the plate 12 but while the temperature of the portion of the rod 14 above the upper surface of the plate 11 is still elevated, the jaws 16 are moved axially inwardly. This movement will shear the rod 14 above the plate 11. The jaws 16 are then moved downwardly so that the lower surfaces upset the upper end of the rod 14 as indicated generally by the reference numeral 19 in the drawings.

The welding methods described may be employed to fix two members with respect to each other and with respect to a rod. Alternatively, the rod may be welded to one plate and upset to fix the other plate axially with respect to the first plate. The plates, however, may be supported for relative rotation so that a pivoted joint is provided.

In the illustrated embodiments the rod has been shown as a solid piece. It is to be understood that a hollow rod could be used in place of the solid rod that is depicted. In some applications it is more advantageous to use a hollow rod since less heat is required to melt such a rod due to its lower mass. Therefore, when the term "rod" is used throughout the specification and claims, it is intended in a generic sense to cover both solid and hollow members.

Various other changes and modifications may be made without departing from the spirit and scope of the invention, as defined by the appended claims.

What is claimed is:

1. The method of joining first and second parts which comprises forming a hole through the first part, placing the first and second parts together so that said hole forms a blind cavity whose bottom is a portion of the second part, inserting a rod into said cavity which is much longer than said cavity so that the bottom of the rod is in contact with the portion of said second part which forms the bottom of said cavity, applying axial pressure to the rod to hold it against said second part and rotating said rod rapidly relative to said second part to cause heating by friction and fusing of the metal of the rod and said second part and to substantially heat the bottom portion of the rod within the hole, continuing rotation of the rod relative to the plate until the rod shears off adjacent the top of the cavity, and applying axial pressure to the sheared off rod to upset it laterally to form a radial shoulder on said rod around said hole engaging the surface of said first part to hold the parts together.

2. The method of joining two metallic pieces together comprising the steps of forming an aperture in one of the pieces, placing the pieces together with the aperture in alignment with the surface of the other piece, inserting a relatively long metallic rod through the aperture so that the bottom surface thereof is in engagement with the aligned surface of the other piece and said rod extends for a substantial length out of said aperture, rapidly rotating the rod relative to the other piece while applying pressure on the engaged surfaces to heat said surfaces sufficiently by friction to accomplish a friction weld therebetween and to heat the rod within the aperture, cutting off the heated rod at a point adjacent the surface of the one piece spaced from the other piece, and upsetting the cut-off rod by inserting an axial pressure upon the remaining welded portion of the rod to form a radial shoulder on the rod for holding the pieces together.

References Cited

UNITED STATES PATENTS

| 1,231,290 | 6/1917 | Otte _____ 29—483 X |
| 3,144,710 | 8/1964 | Hollander et al. _____ 29—470.3 |
| 3,234,646 | 2/1966 | Hollander et al. ____ 29—470.3 X |
| 2,795,039 | 6/1957 | Hutchins _____ 228—2 XR |
| 3,234,644 | 2/1966 | Hollander _____ 228—2 XR |

FOREIGN PATENTS

| 572,789 | 10/1945 | Great Britain. |
| 703,100 | 4/1931 | France. |

JOHN F. CAMPBELL, Primary Examiner

U.S. Cl. X.R.

29—470.5